Aug. 7, 1945.   A. S. EDMONDS   2,381,655
BRAKE
Filed Feb. 5, 1943   3 Sheets-Sheet 2
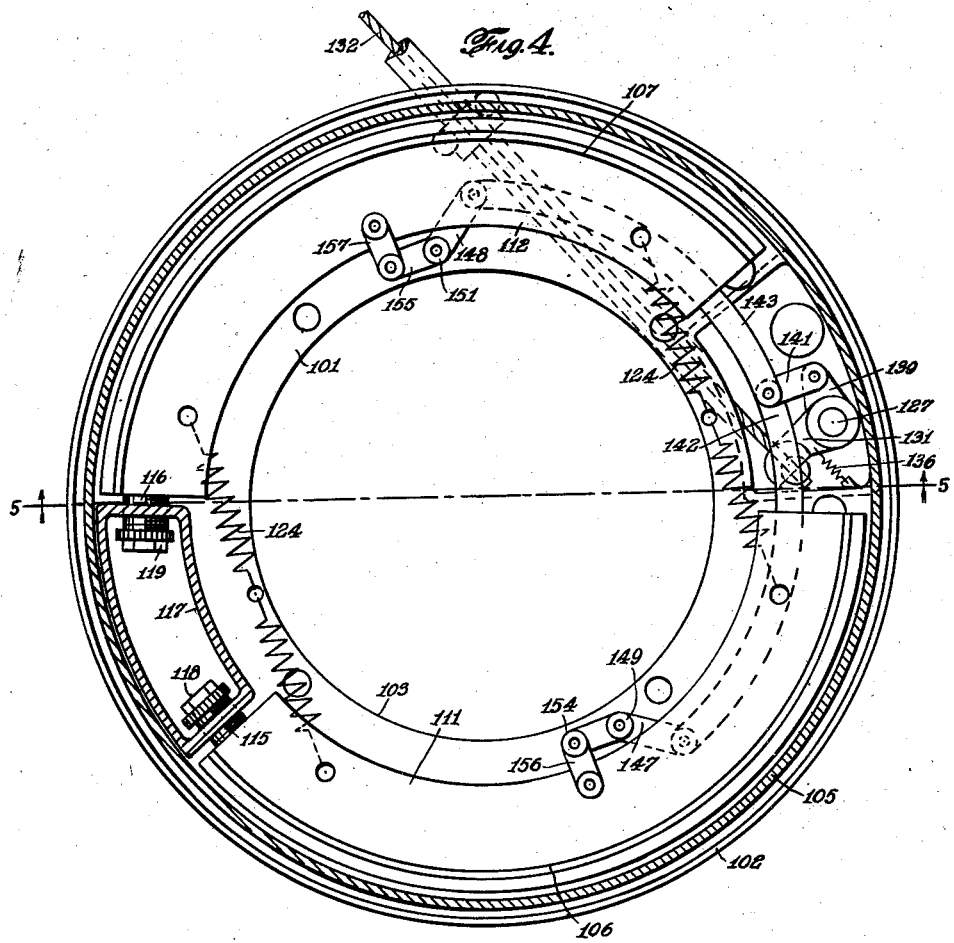
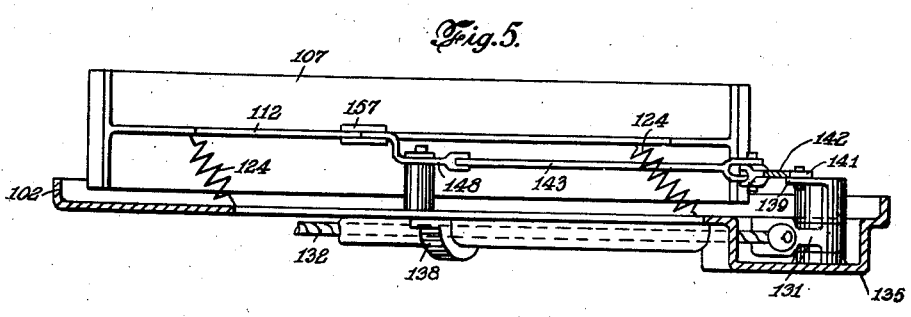
INVENTOR.
ASBURY S. EDMONDS
ATTORNEY.

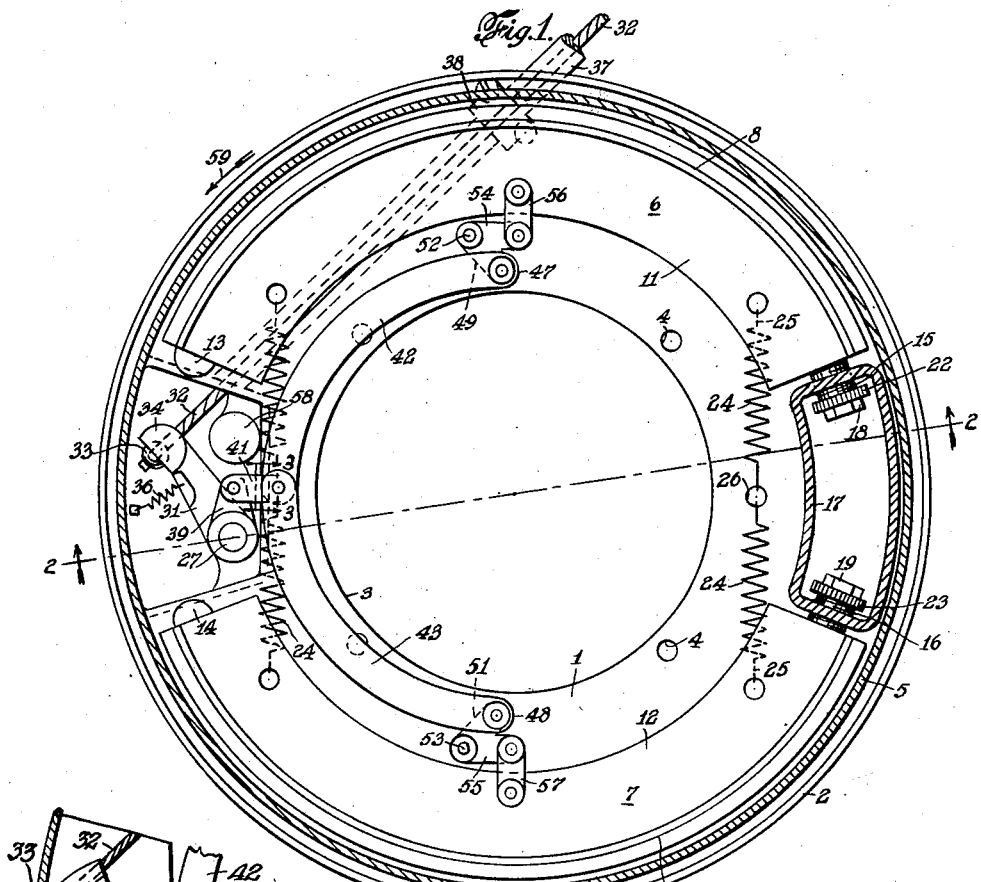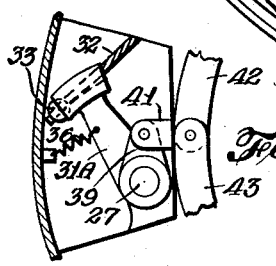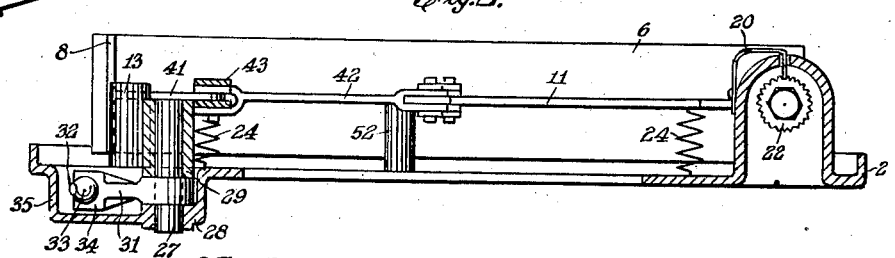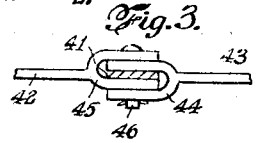

Aug. 7, 1945.  A. S. EDMONDS  2,381,655
BRAKE
Filed Feb. 5, 1943   3 Sheets-Sheet 3

INVENTOR.
ASBURY S. EDMONDS
BY
Louis Prevost Whitaker
ATTORNEY.

Patented Aug. 7, 1945

2,381,655

UNITED STATES PATENT OFFICE 2,381,655

BRAKE

Asbury S. Edmonds, Lowry Field, Colo.

Application February 5, 1943, Serial No. 474,791

11 Claims. (Cl. 188—78)

The present invention relates to brakes for rotating elements and in particular to brakes for the wheels of automotive vehicles. Vehicular brakes are subjected to hard use and are commonly neglected either by receiving inadequate service or by being serviced by persons having limited mechanical skill and knowledge. The brakes of military vehicles receive particularly severe punishment as they must operate under adverse conditions and must at times be adjusted or repaired in the field with inadequate facilities. As brake failure may result in serious accidents and delays, dependable and easily serviced brakes are essential on both civilian and military vehicles.

It is an object of the present invention to provide a vehicle brake that is simple in construction with a minimum number of parts and with the parts so arranged as to be easily assembled and disassembled. In the brake according to my invention, the opposed brake shoes and most of the parts for operating each shoe are duplicates of one another so that the number of parts it is necessary to carry in stock is reduced to a minimum. It is a further object of the invention to provide a brake which is durable and dependable so that frequent servicing is not necessary and is so constructed that the only adjustments required can readily be made from outside the brake housing without special tools and without disturbing the interior mechanism or admitting dirt thereto.

Another object of my invention is to provide maximum braking action with minimum force exerted on the brake pedal or other brake operating elements. This is achieved by the cooperation of a plurality of factors. By reason of the simple construction of the brake, the force applied to operate the brake shoes is transmitted through a minimum number of parts, thereby reducing frictional losses. Moreover, the novel arrangement of the parts is such that force is transmitted in a direct line from one element to another in a direction substantially coincident with the direction of movement of the respective elements so that a maximum proportion of the force applied to the brake pedal is utilized to produce effective braking pressure. A further factor contributing to the high efficiency of the brake is that each of the brake shoes is a primary shoe in both directions of rotation. By the term "primary shoe" is meant that the shoe is so arranged that the revolution of the brake drum in a direction corresponding to the motion of the vehicle tends, on making contact between the shoe and the drum, to press the shoe more tightly against the drum, thereby increasing the braking action obtained.

In the brake of the present invention, both brake shoes act as primary shoes, not only in the forward motion of the vehicle, but also when the vehicle is moving rearwardly, so that maximum braking action is obtained at all times and the braking action and hence the wear of the two shoes are equal. Equalization of the braking action of the two shoes is further assured by the arrangement of the elements applying braking pressure to the shoes.

A further object of the invention is to provide a brake having a large central opening. In certain types of vehicles, for example those with four wheel drives, the brake must fit over a knuckle or universal joint of large diameter. At the same time the outer diameter of the brake is limited by the size of the wheel and the clearance necessary between the circumference of the wheel and the outer circumference of the brake.

In accordance with the present invention the parts are so arranged as to permit a central opening that is unusually large in relation to the outer diameter of the brake housing without sacrificing in any way the other desirable characteristics of the brake.

Other objects and advantages of my invention will be understood from the following description of the embodiments selected by way of example, and illustrated in the accompanying drawings, in which Fig. 1 is an elevation of the brake mechanism as seen from the inner or wheel side of the brake with the brake drum shown in cross section.

Fig. 1A is a fragmentary view corresponding to a portion of Fig. 1 and showing a modification.

Fig. 2 is a sectional view taken approximately on the line 2—2 of Fig. 1.

Fig. 3 is a fragmentary sectional view taken on the line 3—3 of Fig. 1.

Fig. 4 is a view similar to Fig. 1 but showing another embodiment of my invention.

Fig. 5 is a sectional view taken approximately on the line 5—5 of Fig. 4.

Figure 6:
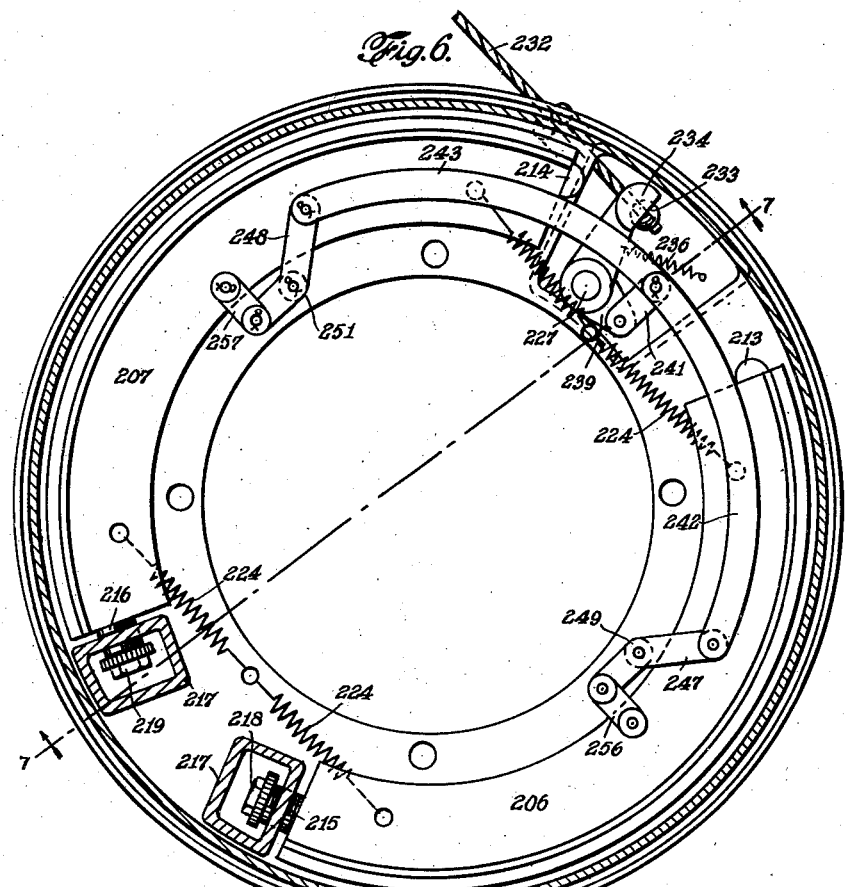
Fig. 6 is a view similar to Fig. 1 showing a further embodiment of my invention.

The present application is a continuation in part of my application Serial No. 452,277, filed July 25, 1942.

The embodiment of my invention shown by way of example in Figs. 1 to 3 has a back plate 1 having a peripheral flange 2, a central opening 3 and bolt holes 4 for securing it to a fixed portion of the vehicle adjacent the wheel, as for example, the axle housing. A brake drum 5 concentric with the back plate 1 is secured to and rotates with the vehicle wheel. On the inner side of the back plate and in the space enclosed by the back plate, the brake drum and the wheel, there are provided opposed arcuate brake shoes 6 and 7, having flange portions 8 and 9 and inwardly projecting web portions 11 and 12. The brake shoes have their adjacent ends spaced from one another and are loosely supported on the back plate, for example by resting on suitable bearing pads provided on the inner surface of said plate. The brake shoes are movable radially outwardly relative to the back plate by means of the operating mechanism described below, being moved from the inner inoperative position shown in Fig. 1, to an operative position in engagement with the brake drum 5. To prevent the brake shoes being carried around by rotation of the brake drum, they are held against circumferential movement by abutments provided on the back plate 1. To permit adjustment of the brake shoes, provision is made for varying the distance between the abutments. In the embodiment shown in Fig. 1 a fixed abutment 13, 14 is provided at one end of each shoe and an adjustable abutment at the other. The adjustable abutment is provided by a rotatable threaded element shown in the form of a screw 15, 16 threaded through the wall of an inwardly projecting blister 17 formed in the back plate 1. As the blister 17 opens to the outer face of the back plate, the outer end of the screw 15, 16 is accessible from the outside of the back plate and is preferably provided with a suitable head 18, 19 for rotation of the screw by a wrench or other tool. By screwing the threaded element 15, 16 farther in, the corresponding brake shoe 6, 7 is held closer to the brake drum in its inoperative position thus making it possible to compensate for wear. Proper adjustment of the brake shoes can readily be made by screwing the screws 15, 16 in until the brake shoes are in contact with the drum and then backing them up a predetermined distance. Each of the screws 15, 16 is provided with means for holding it in the position to which it has been turned. As shown in Figs. 1 and 2 the locking means comprises a spring latch 20, engaging a serrated disc portion 22, 23 on the screw, the latch being preferably mounted on the inner side of the back plate where it is protected from the weather and having a disc engaging portion extending out through a slit provided in the wall of the back plate. With the arrangement shown, micrometric adjustment of the brake can be effected from outside the brake housing without disturbing the inner mechanism of the brake or permitting dirt to enter the mechanism and without there being any projecting parts that might become broken or damaged in driving over rough terrain.

The brake shoes 6, 7, are normally held in inoperative position against the abutments 13, 14 and 15, 16 by a plurality of tension springs 24 attached at one end to the web portion of the brake shoe 25 and at the other end 26 to the back plate. The location of the points of attachment is such that the springs extend inwardly and towards the back plate at an angle thereto so as to tend to move the shoes radially inwardly and at the same time to hold the shoes in position against the back plate. By reason of this arrangement of the springs, no other means of attaching the brake shoes to the back plate is required and the construction of the brake is thereby further simplified.

As shown in Figs. 1 to 3, the brake operating mechanism comprises a rocker shaft 27, rotatably supported by bearings 28 and 29 with its axis parallel to the axis of the brake, i. e., the axis of rotation of the vehicle wheel. On the rocker shaft 27 there is provided a rocker arm 31 to the outer end of which is connected a brake operating element shown in the form of a cable 32, having at its end a ball 33 received in a bifurcated socket 34 at the end of the rocker arm. The cable 32 is connected to a brake pedal or lever (not shown) through suitable equalizing means such as that shown in U. S. Patent No. 2,227,301 for equalizing the braking action on all of the braked wheels of the vehicle. It will be seen that the rocker arm 31 and adjacent portion of shaft 27 are located in a blister 35 protruding on the outer side of the backing plate 1 and that the cable 32 extends out through the wall of the blister in a straight line which is approximately perpendicular to the plane defined by the axis of shaft 27 and the radius of arm 31. The pull of the cable is thus substantially in line with the direction of movement of the outer end of said arm so that the full force of the cable tension is applied to rock the shaft 27. Although the angle of the arm changes as the shaft is rocked, the variations within the limits of movement of the operating mechanism are so slight as to be inconsequential. Preferably the pull of the cable is exactly perpendicular to the radius of the rocker arm at an intermediate point in its movement. If desired, the rocker arm may be in the form of a segment of a pulley 31A as illustrated in Fig. 1A so that the pull of the cable will be exactly perpendicular to the effective radius of the rocker arm at all times. As viewed in Fig. 1, the shaft 27 is rocked in a clockwise direction by a pull on the cable 32, and is rocked in the opposite direction by a spring 36. The cable 32 is preferably sheathed in a flexible conduit 37 secured to the back plate by a fitting 38, the portion of the cable between the fitting 38 and the blister 35 being enclosed in a suitable channel. By terminating the sheath 37 a substantial distance from the end of the cable 32, slight lateral movement of the end of the cable incident to the rocking movement of arm 31 is permitted without causing the cable to bind in its sheath.

The rock shaft 27 projects on the inner side of the back plate 1 and is provided at its inner end with a second rocker arm 39 pivotally connected to one end of an actuating link 41 located approximately mid-way between the spaced ends of the brake shoes 6, 7. The other end of the actuating link 41 is pivotally connected to opposed arcuate links 42, 43, the adjacent ends of said arcuate links being thus pivotally connected with the actuator and with each other. The preferred form of this pivotal connection is illustrated in Fig. 3 where it will be seen that the arcuate link 42 has a bifurcated end portion 45 straddling the actuating element 41. The second arcuate link 43 is identical with the first, but in reversed position, having a bifurcated end portion 45 straddling the actuating element 41 and one arm of the bifurcated ends of the first mentioned link. A pivot pin 46 extends through the actuating element 41 and the bifurcated ends of both arcuate links 42, 43. Preferably the bifurcated end of each link is sufficiently offset with respect to the body portion thereof to position the actuating elements 41 and the body portions of both arcuate links 42, 43 in a common plane so that there is no twisting action or binding in the pivotal connection. The arcuate links 42, 43 are preferably approximately concentric with the brake shoes and lie closely adjacent the web portions of the shoes.

The opposite end of each of the arcuate links 42, 43 is connected with one of the brake shoes in such manner as to apply force radially to said shoe at a point approximately mid way between the ends of the shoe. In the arrangement shown in Figs. 1 and 2 each arcuate link is connected with one arm 47, 48 of a bell crank lever 49, 51 pivotally mounted on the back plate by means of a pivot post 52, 53, the other arm 54, 55 of the bell crank lever is connected with the web portion of the brake shoe by means of a link 56, 57. The link 56, 57 is preferably double or bifurcated at both ends and the end of the arcuate link 42, 43 that is connected with the bell crank 49, 51 is likewise bifurcated so that there is no torsional or binding action in any of the pivotal connections. The angular relation of the arms of the bell crank 49, 51 is such that one arm 47, 48 is approximately perpendicular to a line connecting the ends of the arcuate link 42, 43 while the other arm 54, 55 is approximately perpendicular to the link 56, 57 or in other words to the radius of the back plate passed through the outer end of said arm. By reason of this relationship, the force applied to each element of the brake is substantially in line with the direction of movement of that element so that a maximum proportion of the force applied to the brake pedal is transmitted to the brake shoes.

It will be noted that corresponding parts on diametrically opposite sides of the brake including the brake shoes 6, 7, the adjusting screws 15, 16, the tension springs 24, the arcuate links 42, 43, bell cranks 49, 51 and connecting links 56, 57 are identical with one another, thereby reducing to a minimum the number of different parts that must be manufactured and carried in stock. Moreover, merely by reversing the position of rock shaft 27 and associated parts, the same brake can be used for either a right hand or a left hand wheel. For this purpose, the blister 35 is made symmetrical and is provided with an extra boss 58 which can be drilled to provide bearings for the rock shaft, when its position is reversed.

The operation of the brakes will be understood from the preceding description of its construction. The brake shoes 6, 7 are normally held out of contact with the brake drum 5 by the springs 24. To apply the brakes a pull is exerted on the brake operating cable 32 rocking the shaft 27 and the associated rocker arms 31 and 39 in a clockwise direction as viewed in Fig. 1 and moving the actuating elements 41 longitudinally toward the center of the back plate. This movement exerts a thrust on the opposed arcuate links 42, 43 causing the former to rotate bell crank 49 in a counterclockwise direction and the latter to rotate bell crank 51 in a clockwise direction, thereby exerting pressure on the brake shoes in a radial direction to force them outwardly into engagement with the brake drum 5. It will be seen that as the actuating link 41 is free to swing laterally as well as to move longitudinally, equal pressure will be exerted on both brake shoes. Thus if the pressure on brake shoe 6 is less than on brake shoe 7, the actuating element will be swung toward the former shoe, causing a greater pressure to be exerted on brake shoe 6. Moreover, it will be seen that both brake shoes act as primary shoes. If in forward motion of the vehicle the brake drum rotates in a counterclockwise direction as indicated by arrow 59 in Fig. 1, the frictional engagement of brake shoe 6 with the drum will tend to swing the brake shoe about the fixed abutment 13 as a pivot, thereby pressing the shoe more firmly against the brake drum and producing greater braking action. In like manner brake shoe 7 will tend to swing about the abutment 16 as a pivot to increase the braking pressure and thereby augment the force applied by the brake operating mechanism. If the vehicle is moving in reverse so that the brake drum 5 is rotating in a clockwise direction, brake shoe 6 will tend to pivot about the adjustable abutment 15 and brake shoe 7 will tend to pivot about the fixed abutment 14 to increase the braking action in the manner just described. Thus, both shoes act as primary shoes when the vehicle is moving in reverse as well as when it is moving forward. This assures maximum braking action under all conditions and also provides equal strain and equal wear on both shoes.

Another embodiment of my invention is illustrated in Figs. 4 and 5 where corresponding parts are designated by the same reference numerals as in Figs. 1 to 3 with the addition of 100. In this embodiment the positions of the rock shaft 127 and the rocker arms 131 and 139 are reversed and the cable 132 is made to pull in the opposite direction so that a pull of the cable moves the actuating element 141 radially outwardly, exerting a pull on arcuate links 142 and 143. The positions of the arms 147, 148 of bell cranks 149, 151 are also reversed as shown in Fig. 4 so that these arms extend outwardly beyond the inner edges of the web portions 111, 112 of brake shoes 106, 107. It will be seen that with this arrangement of the parts the arcuate links 142, 143 and the web portions 111, 112 of the brake shoes lie one above the other in overlapping relationship. In the embodiment shown in Figs. 4 and 5 the arcuate links lie underneath the web portions of the brake shoes, i. e., between the webs and the back plate. This permits removal of the brake shoes 106, 107 merely by disconnecting links 156, 157 and springs 124 without disturbing in any way the rest of the brake operating mechanism. Except for the different direction of movement of certain of the parts as described above, the operation of the brake is the same as that illustrated in Figs. 1 to 3.

Figure 7:
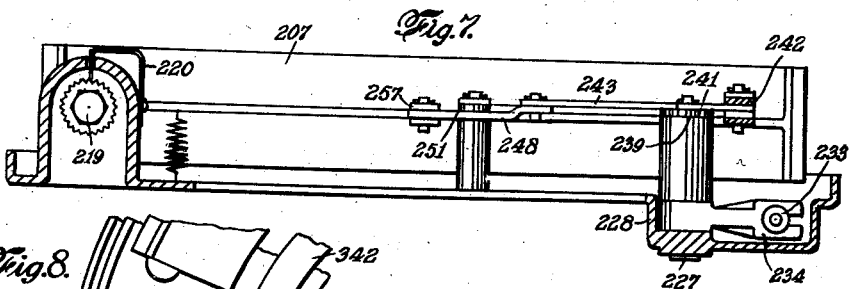
Fig. 7 is a sectional view taken approximately on the line 7—7 of Fig. 6.

A further embodiment of the invention is shown in Figs. 6 and 7 in which corresponding parts are designated by the same reference numerals as in Figs. 1 to 3 with the addition of 200. This embodiment is similar to that shown in Figs. 4 and 5 in that the positions of the bell crank arms 247 and 248 extend outwardly beyond the inner edge of the web portions of the brake shoes so that the arcuate links 242, 243 and the web of the brake shoes are in superimposed relationship. However, in Fig. 6 the arcuate links are shown as being located above rather than below the web portions of the brake shoes. As in the embodiment of Figs. 4 and 5, the bell crank arms 247, 248 are approximately perpendicular to a line connecting the ends of the corresponding arcuate links 242, 243 so that force is applied substantially in line with the direction of movement of the parts, as explained above. The location of the rock shaft 227 is similar to that shown in Fig. 1, but the actuating link 241 and operating cable 232 are reversed so that a pull on the cable rocks shaft 227 in a counter clockwise direction causing rocker arm 239 to exert a thrust on actuating link 241 moving the link radially outwardly with respect to the back plate. This exerts a pull on arcuate links 242, 243, rocking bell crank lever 249 in a counterclockwise direction and bell crank lever 251 in a clockwise direction to apply pressure radially to the respective brake shoes. As will be seen in Fig. 6 separate blisters 217 may be provided in the back plate for adjusting screws 215, 216 in place of the single blister illustrated in the embodiment previously described.

The simple construction and compact arrangement of the brake in accordance with the present invention permits a large central opening in the back plate so that the brake will fit over the universal joint provided in four wheel drive vehicles or over other parts of large diameters. This is particularly true of the embodiment shown in Figs. 4 to 7 where the arcuate links are located outside of the inner edges of the web portions of the brake shoes.

Figure 8:
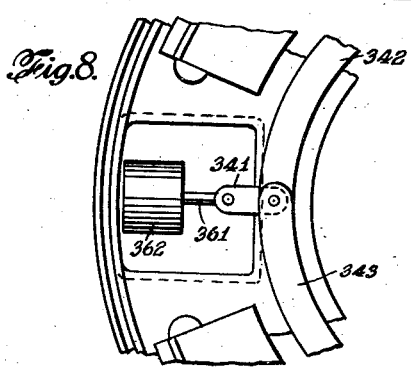
Fig. 8 is a fragmentary view corresponding to the left hand portion of Fig. 1 and showing a further modification.

As illustrated in Fig. 8, the brakes may be operated hydraulically instead of mechanically. For example, instead of being connected to a rocker arm as previously described, the actuating link 341 may be connected to the piston 361 of a hydraulic cylinder 362, mounted on the back plate. It will be understood that fluid under pressure is applied to cylinder 362 by a suitable hydraulic brake operating system (not shown) to force the piston toward the right as viewed in Fig. 8 and thereby apply pressure to the brake shoes through the actuating element 341 and arcuate links 342 and 343. Except for the replacement of the rock shaft and associated rocker arms by the hydraulic piston and cylinder, the brake may be the same as in the previously described embodiments.

What I claim and desire to secure by Letters Patent is:

1. In a vehicle brake, having a back plate and opposed brake shoes, brake operating mechanism comprising an actuating element capable of both longitudinal and lateral movement, opposed arcuate links having adjacent ends pivotally connected to each other and to said actuating element, and oppositely located bell cranks pivotally mounted on said back plate and each having an arm connected with one of said links and another arm connected with a brake shoe.

2. A brake mechanism comprising in combination opposed arcuate brake shoes having adjacent ends spaced from one another, an actuator disposed between said spaced ends of the brake shoes, opposed arcuate links approximately concentric with and adjacent to said brake shoes, said links having adjacent ends pivotally connected with each other and with said actuator, and means connecting the opposite end of each of said links with one of the brake shoes to apply force radially to said shoe at a point approximately midway between the ends of the shoe.

3. In a vehicle brake having a back plate and opposed brake shoes, operating mechanism comprising an actuating element, opposed links having adjacent ends pivotally connected with each other and with said actuating element, a bell crank pivotally mounted on said back plate near the mid-point of each brake shoe and having an arm pivotally connected with the opposite end of one of said links and disposed approximately perpendicular to a line connecting the pivot points of said link, and an arm disposed approximately perpendicular to the radius of the back plate passing through the outer end of said arm, and means connecting said last mentioned arm of the bell crank with the adjacent brake shoe to transmit force to said shoe in a radial direction.

4. In a brake mechanism having a back plate and opposed brake shoes, the combination of an actuating element, a link having a body portion and a bifurcated end portion straddling said actuating element, a second link identical with the first but in reversed position and having a bifurcated end portion straddling said actuating element and one arm of the bifurcated end of the other link, a pivot pin extending through said element and the bifurcated ends of both links, the bifurcated end of each link being offset with respect to the body portion thereof to position said actuating element and the body portions of both links in a common plane, and means connecting the opposite end of each link with one of said brake shoes to transmit force from the actuating element to the said shoes.

5. A brake mechanism comprising a back plate, opposed brake shoes positioned on the inner face of said plate, said back plate being provided with a blister projecting on the outer side thereof, a shaft rotatably mounted in said blister, and projecting on the inner side of the back plate with its axis parallel to the axis of the brake, an arm projecting from said shaft inside said blister, a brake operating element extending through the wall of said blister and connected to the outer end of said arm, a second arm projecting from the inner end of said shaft, an actuating link pivotally connected to said second arm, opposed arcuate links having adjacent ends pivotally connected with said actuating link and with each other, and means connecting the opposite end of each of said arcuate links with one of the brake shoes to transmit force to said shoe in a radial direction.

6. A brake mechanism comprising a back plate, opposed arcuate shoes having adjacent ends spaced from one another, an actuator disposed between said spaced ends of the brake shoes, opposed arcuate links having adjacent ends pivotally connected with said actuator and each other, means connecting the opposite end of each of said links with one of the brake shoes to apply force radially to said shoe at a point approximately midway between the ends of the shoe, tension springs attached to the brake shoe at points on each side of said midpoint and spaced from the ends of the shoe, said springs extending inwardly and toward the back plate to a point of attachment thereon at such angle to the back plate as to urge the shoes radially inwardly against the action of said links and to hold the shoes firmly against the back plate.

7. In a vehicle brake, the combination of a back plate, opposed arcuate brake shoes resting on the inner side of said back plate and having adjacent ends spaced from one another, each of said shoes comprising an outer flange portion and an inwardly projecting web portion, abutments on said back plate for holding the brake shoes against circumferential movement, an actuating element disposed between the spaced ends of the brake shoes, opposed arcuate links having adjacent ends pivotally connected with said actuating element and with each other, means connecting the opposite end of each of said links with one of the brake shoes to apply force radially to said shoe at a point approximately midway between the ends of the shoe, said arcuate links overlapping the web portions of the brake shoes.

8. In a vehicle brake, the combination of a back plate, opposed arcuate brake shoes disposed on the inner side of said back plate and having adjacent ends spaced from one another, an actuating element disposed between the spaced ends of the brake shoes, each of said shoes comprising an outer flange portion and an inwardly projecting web portion, a bell crank pivotally mounted on said back plate adjacent the inner edge of the web portion of each shoe and having an arm for applying pressure to said shoe and a second arm extending outwardly beyond the inner edge of said web portion and an arcuate link extending arcuately of the back plate in juxtaposition with the web portion of the adjacent brake shoe and having one end pivotally connected with the last mentioned arm of said bell crank and the other end pivotally connected with said actuating element.

9. In a vehicle brake having a back plate and opposed brake shoes having adjacent ends spaced from one another, operating mechanism comprising a hydraulic actuator located between said spaced ends of the brake shoes, said actuator including an element capable of longitudinal and lateral movement, opposed arcuate links having adjacent ends pivotally connected with each other and with said actuator element and means connecting the opposite end of each of said links with one of the brake shoes to apply force to said shoes in a direction substantially radial of the back plate at a point approximately midway between the ends of the respective shoes.

10. A brake mechanism comprising a pack plate, opposed arcuate brake shoes loosely supported on the inner face of said plate, means for holding each brake shoe against movement circumferentially of the back plate, comprising a fixed abutment on said back plate engaging one end of the brake shoe, a blister projecting inwardly on the inner side of the back plate adjacent the other end of said shoe, said blister opening to the outer face of the back plate, and a rotatable threaded element extending through the wall of said blister with its outer end disposed in said blister and thereby accessible from the outer side of the back plate for rotation of said element and its inner end providing an adjustable abutment for said other end of the brake shoe, and actuating mechanism for applying force radially outwardly to each of said brake shoes at a point approximately midway between said fixed abutment and movable abutment.

11. In a brake mechanism, the combination of a back plate, a pair of opposed arcuate brake shoes resting freely on the inner side of said back plate, each of said shoes having an outer flange portion and an inwardly projecting web portion, spaced abutments on said back plate for holding each of the brake shoes against circumferential movement, actuating mechanism for applying force radially outwardly to each of said brake shoes at a point approximately midway between its ends, and a pair of tension springs connected at one end to the back plate, and at the other end to the web portion of each of said shoes at points on opposite sides of the mid-point of said shoe, said springs extending inwardly and toward the back plate at such angle as to urge the shoes radially inwardly and to act of themselves to hold each of said brake shoes in proper position against the back plate.

ASBURY S. EDMONDS.